United States Patent
Husband et al.

(10) Patent No.: US 11,415,064 B2
(45) Date of Patent: Aug. 16, 2022

(54) GEARED ARCHITECTURE FOR GAS TURBINE ENGINE

(71) Applicant: United Technologies Corporation, Farmington, CT (US)

(72) Inventors: Jason Husband, South Glastonbury, CT (US); William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 300 days.

(21) Appl. No.: 16/689,690

(22) Filed: Nov. 20, 2019

(65) Prior Publication Data

US 2021/0148287 A1     May 20, 2021

(51) Int. Cl.
    *F02C 7/36*     (2006.01)
    *F16H 57/00*     (2012.01)
    *F16H 57/08*     (2006.01)

(52) U.S. Cl.
    CPC ........... *F02C 7/36* (2013.01); *F16H 57/0006* (2013.01); *F16H 57/08* (2013.01); *F05D 2260/40311* (2013.01); *F05D 2260/96* (2013.01); *F16H 2057/085* (2013.01)

(58) Field of Classification Search
    CPC ....................................................... F02C 7/36
    See application file for complete search history.

(56) References Cited

U.S. PATENT DOCUMENTS

| | | | |
|---|---|---|---|
| 10,094,278 B2 * | 10/2018 | Sheridan | F01D 25/162 |
| 10,119,548 B2 | 11/2018 | Venter | |
| 10,202,905 B2 | 2/2019 | Venter | |
| 2010/0105516 A1 * | 4/2010 | Sheridan | F16H 57/021 |
| | | | 475/346 |
| 2014/0219783 A1 * | 8/2014 | Coffin | F02K 3/06 |
| | | | 415/119 |
| 2017/0082031 A1 * | 3/2017 | Miller | F16H 1/28 |
| 2018/0010551 A1 * | 1/2018 | Sheridan | F02C 7/36 |
| 2018/0291819 A1 | 10/2018 | Sheridan | |
| 2019/0257213 A1 | 8/2019 | Zilli | |
| 2020/0332721 A1 * | 10/2020 | Simon | F16H 1/28 |

FOREIGN PATENT DOCUMENTS

| | | |
|---|---|---|
| EP | 3144486 | 3/2017 |
| WO | 2015042553 | 3/2015 |

OTHER PUBLICATIONS

Extended EP Search Report for EP Application No. 20209069.2 dated Apr. 14, 2021.

* cited by examiner

*Primary Examiner* — Justin D Seabe
(74) *Attorney, Agent, or Firm* — Carlson, Gaskey & Olds, P.C.

(57) ABSTRACT

A turbofan engine includes a fan section. A turbine section is in driving engagement with the fan section through a geared architecture. A flexible support supports the geared architecture relative to an engine static structure. A deflection limiter includes at least one of an axially extending branch or a radially extending branch. A flexible output shaft is in driving engagement with the fan section and driven by the geared architecture. A speed change mechanism for a gas turbine engine is also disclosed.

17 Claims, 5 Drawing Sheets

GEARED ARCHITECTURE FOR GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Traditionally, a fan drive turbine has driven the fan directly on a common spool and at a single speed. More recently, a gear reduction has been placed between the fan and the fan drive turbine. This allows the fan to rotate at slower speeds than the fan drive turbine.

SUMMARY

In one exemplary embodiment, a turbofan engine includes a fan section. A turbine section is in driving engagement with the fan section through a geared architecture. A flexible support supports the geared architecture relative to an engine static structure. A deflection limiter includes at least one of an axially extending branch or a radially extending branch. A flexible output shaft is in driving engagement with the fan section and driven by the geared architecture.

In a further embodiment of any of the above, the deflection limiter includes the axially extending branch and a radial damper housing at least partially surrounds the axially extending branch.

In a further embodiment of any of the above, at least one seal at least partially defines a fluid damper passage with the axially extending branch and the radial damper housing and a damper fluid is located in the fluid damper passage.

In a further embodiment of any of the above, the deflection limiter includes the radially extending branch and an axial damper housing at least partially surrounds the radially extending branch.

In a further embodiment of any of the above, at least one seal at least partially defines a fluid damper passage with the radially extending branch and the axial damper housing and a damper fluid is located in the fluid damper passage.

In a further embodiment of any of the above, the geared architecture includes a plurality of intermediate gears surrounding a sun gear in driving engagement with a flexible input shaft. A carrier supports the plurality of intermediate gears and includes a first carrier bearing flange. A ring gear surrounds the plurality of intermediate gears.

In a further embodiment of any of the above, the first carrier bearing flange extends axially aft from an aft plate of the carrier.

In a further embodiment of any of the above, sun gear includes an aft sun gear bearing flange and at least one sun gear carrier bearing engages the first carrier bearing flange and the aft sun gear bearing flange.

In a further embodiment of any of the above, the ring gear includes a ring gear bearing flange and at least one ring gear carrier bearing engaging the first carrier bearing flange and the ring gear bearing flange.

In a further embodiment of any of the above, the at least one ring gear carrier bearing includes at least one inner race that engages a radially outer side of the ring gear bearing flange and an outer race that engages a radially inner side of the first carrier bearing flange.

In a further embodiment of any of the above, the ring gear includes an axially forward extending portion extending forward of a forward plate of the carrier and a radially inward extending portion having the ring gear bearing flange.

In a further embodiment of any of the above, the ring gear bearing flange extends axially downstream from the radially inward extending portion of the ring gear.

In another exemplary embodiment, a speed change mechanism for a gas turbine engine includes a geared architecture including a plurality of intermediate gears surrounding a sun gear in driving engagement with a flexible input shaft. A carrier supports the plurality of intermediate gears and include a first carrier bearing flange. A ring gear surrounds the plurality of intermediate gears and includes a ring gear bearing flange. At least one ring gear carrier bearing engages the carrier bearing flange and the ring gear bearing flange. A flexible support supports the geared architecture. A deflection limiter includes at least one of an axially extending branch or a radially extending branch. The geared architecture is in driving engagement with a flexible output shaft.

In a further embodiment of any of the above, the deflection limiter includes the axially extending branch and a radial damper housing at least partially surrounds the axially extending branch and the radially extending branch and an axial damper housing at least partially surrounds the radially extending branch.

In a further embodiment of any of the above, at least one seal at least partially defines a fluid damper passage with the axially extending branch and the radial damper housing and a damper fluid is located in the fluid damper passage.

In a further embodiment of any of the above, at least one seal at least partially defines a fluid damper passage with the radially extending branch and the axial damper housing and a damper fluid is located in the fluid damper passage.

In a further embodiment of any of the above, the at least one ring gear carrier bearing includes at least one inner race that engages a radially outer side of the ring gear bearing flange and an outer race that engages a radially inner side of the first carrier bearing flange.

In a further embodiment of any of the above, the ring gear includes an axially forward extending portion extending forward of a forward plate of the carrier and a radially inward extending portion having the ring gear bearing flange.

In a further embodiment of any of the above, the first carrier bearing flange extends axially aft from an aft plate of the carrier.

In a further embodiment of any of the above, sun gear includes an aft sun gear bearing flange and at least one sun gear carrier bearing engaging the first carrier bearing flange and the aft sun gear bearing flange.

DETAILED DESCRIPTION

Figure 1:
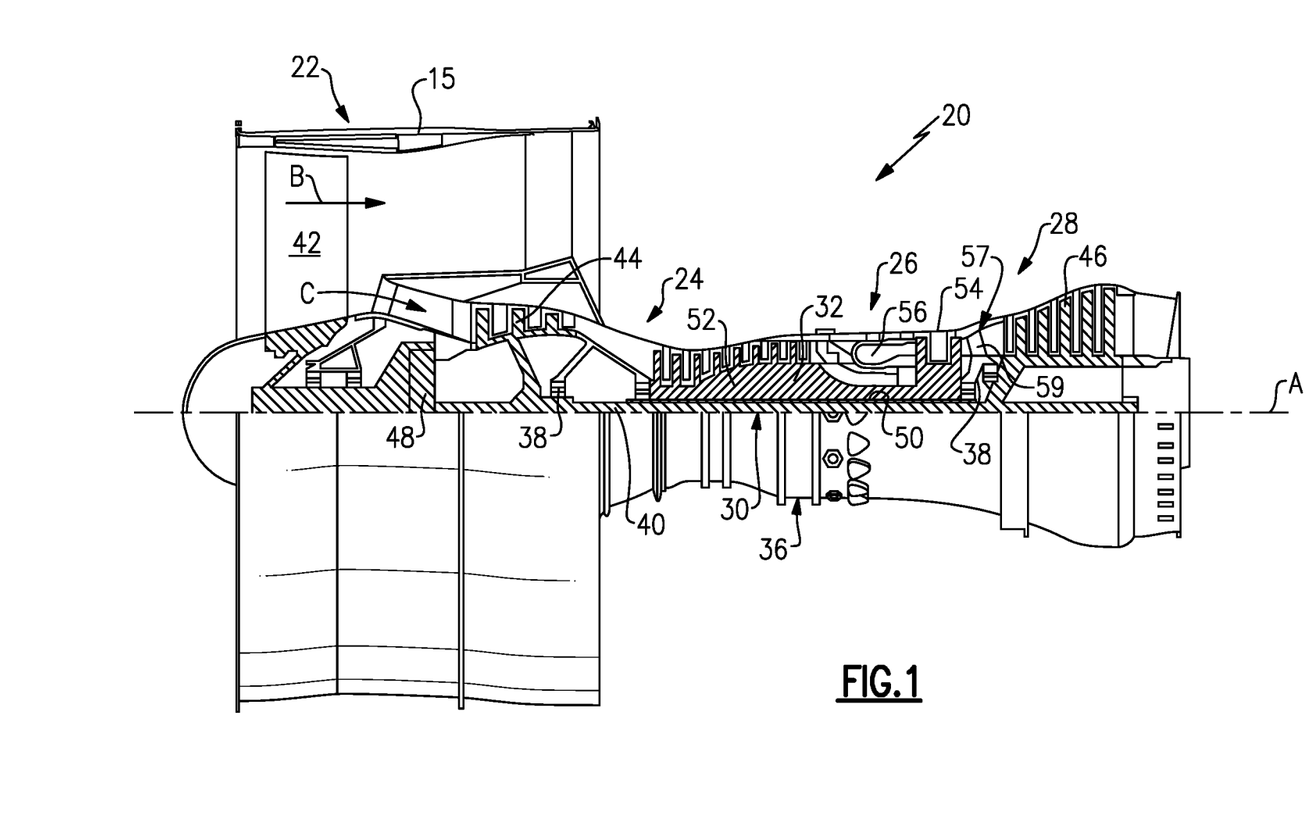
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10) and less than about 20, the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second) and greater than about 900 ft/second.

Figure 2:
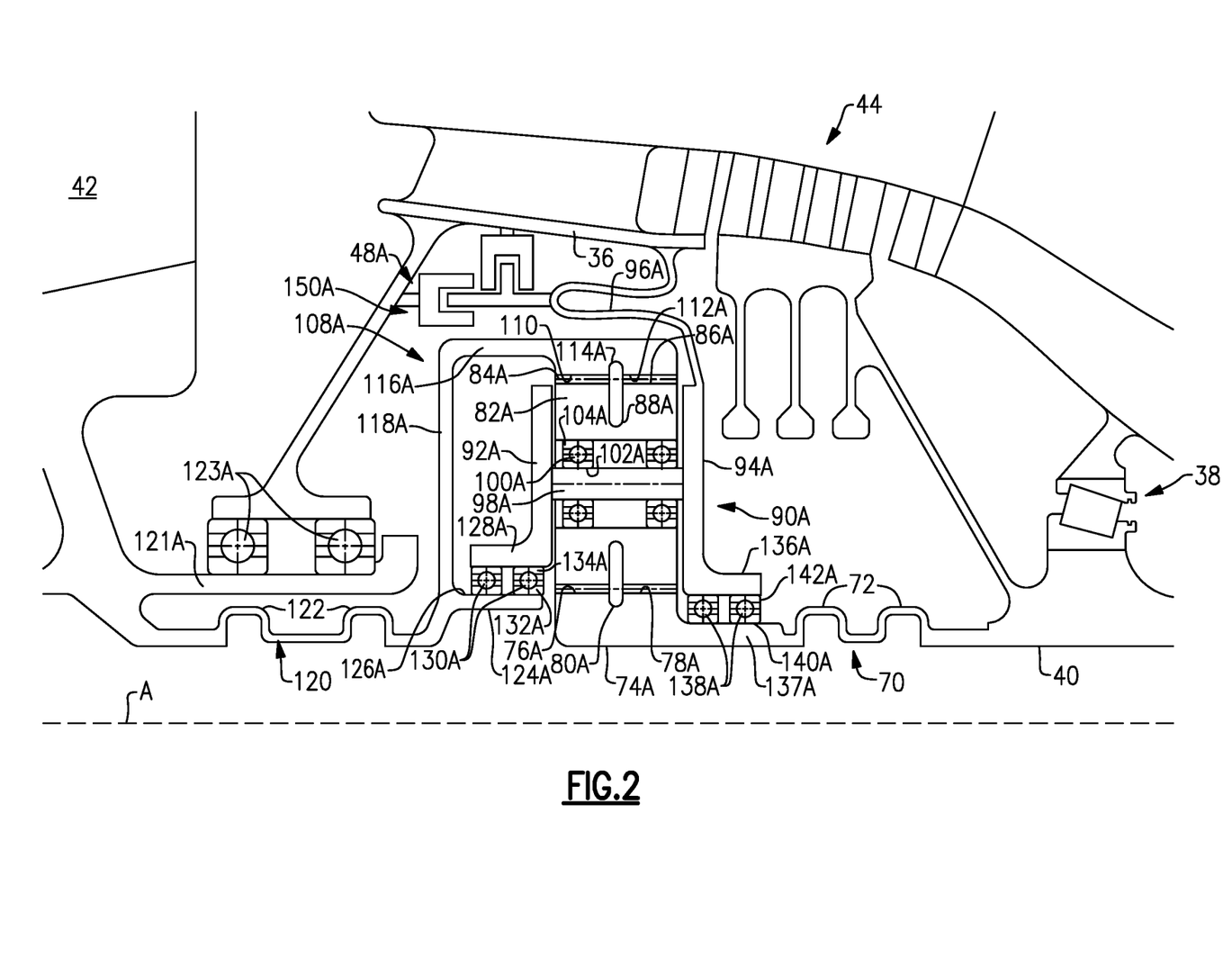
FIG. 2 illustrates a geared architecture according to one example.

FIG. 2 illustrates an enlarged view of the geared architecture 48. In the illustrated example, the inner shaft 40 drives a flexible input shaft 70 having a plurality of undulations 72, which contribute to the flexibility of the input shaft 70. The inner shaft 40 also drives the low pressure compressor 44 at the same rotational speed as the flexible input shaft 70 such that the low pressure compressor 44 rotates at a higher rotational speed than the fan 42.

Figure 4:
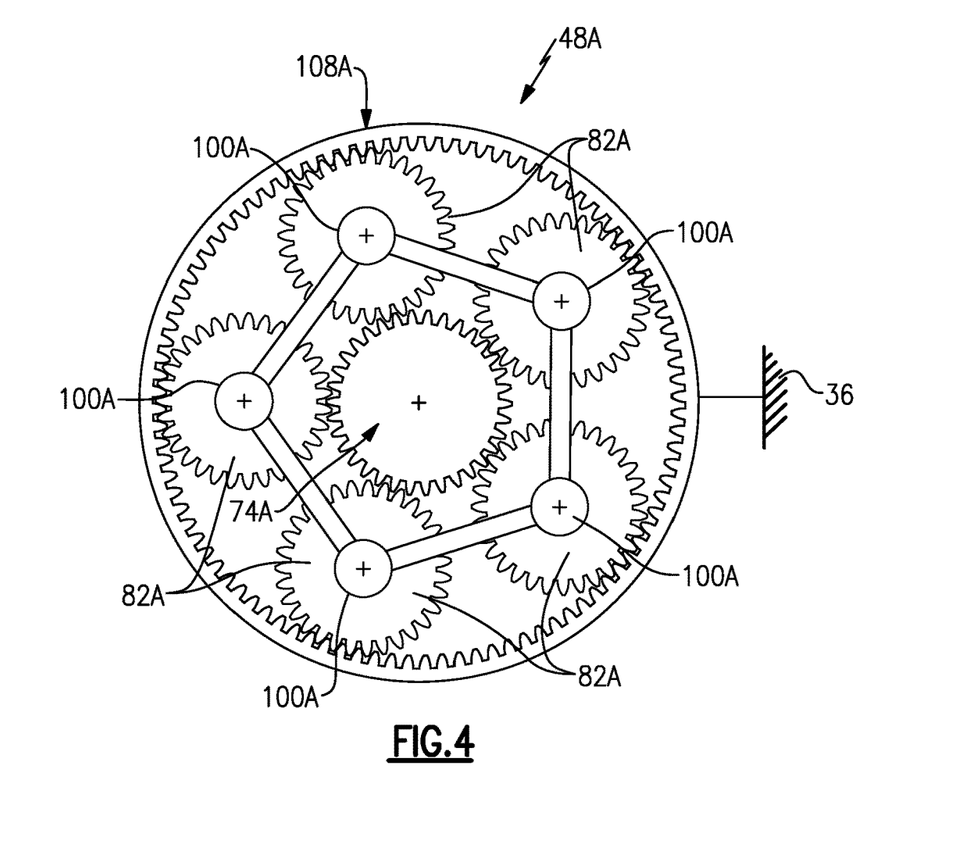
FIG. 4 is a cross-sectional view of the geared architecture of FIG. 2.

The geared architecture 48A can include a sun gear 74A, a carrier 90A supporting star gears 82A, and a ring gear 108A. The sun gear 74A is driven by the flexible input shaft 70. In the illustrated example, the sun gear 74A includes a first set of sun gear teeth 76A located axially forward of a second set of sun gear teeth 78A that are separated by a sun gear trough 80A. As shown in FIGS. 2 and 4, multiple star gears 82A are circumferentially spaced around the sun gear 74A and include a first set of star gear teeth 84A located axially forward of a second set of star gear teeth 86A that are separated by a star gear trough 88A. The first and second set of sun gear teeth 76A, 78A engage a corresponding one of the first and second set of star gear teeth 84A, 86A, respectively. In this disclosure, axial or axially and radial or radially is in relation to the engine axis A unless stated otherwise. Additionally, upstream and downstream and forward and aft are in relation to a direction of airflow through the engine 20.

The carrier 90A includes a forward plate 92A fixed relative to an aft plate 94A. Both the forward and aft plates 92A, 94A are fixed from rotating relative to the engine static structure 36 by a flexible carrier support 96A engaging the aft carrier plate 94A and a portion of the engine static structure 36. The flexible carrier support 96A includes at least one undulation that contributes to the flexibility of the flexible carrier support 96A. In the illustrated example, the forward and aft plates 92A, 94A support star gear shafts 98A that are fixed relative to the forward and aft plates 92A, 94A. Star gear bearings 100A include an inner race 102A that is fixed relative to the star gear shafts 98A and an outer race 104A that is fixed relative to the star gears 82A and rotates with the star gears 82A. Although the star gear bearings 100A are shown are ball bearings, other types of bearings such as roller bearings or journal bearings could be used to support the star gears 82A.

The ring gear 108A is located radially outward from the star gears 82A and includes a forward set of ring gear teeth 110A located axially forward of an aft set of ring gear teeth 112A that are separated by a ring gear trough 114A. The forward and aft sets of ring gear teeth 110A, 112A engage the forward and aft set of star gear teeth 84A, 86A, respectively. The ring gear 108A also includes a forward extending projection 116A that extends axially forward until it reaches a radially extending projection 118A that extends radially inward toward a flexible output shaft 120.

In the illustrated example, the flexible output shaft 120 includes multiple undulations 122 that contribute to the flexibility of the flexible output shaft 120 while still allowing the flexible output shaft 120 to transmit torque and rotational forces. The fan 42 is supported for rotation about the engine axis A by a fan drive shaft 121 with fan shaft bearings 123 engaging the fan drive shaft 121 on a radially inner side and the engine static structure 36 on a radially outer side. In the illustrated example, the flexible output shaft 120 is located radially inward from the fan drive shaft 121 and engages the fan drive shaft 121 axially forward of the fan shaft bearings 123. One feature of this configuration is an increased axial length of the flexible output shaft 120 to allow for greater flexibility and a more axially compact design of the gas turbine engine 20 because the fan drive shaft 121 and the flexible output shaft 120 overlap axially.

In the illustrated example, a ring gear aft extending bearing flange 124A extends axially downstream or aft from the radially extending projection 118A. The bearing flange 124A includes a radially outer surface 126A having a generally constant radial dimension. The bearing flange 124A is at least partially axially aligned with a forward extending bearing flange 128A extending axially forward from the forward plate 92A of the carrier 90A. A pair of ring gear carrier bearings 130A each include an inner race 132A that rotates with the ring gear 108A and the flexible output shaft 120 and an outer race 134A that is fixed relative to the forward plate 92A of the carrier 90A. In the illustrated example, there are two ring gear carrier bearings 130A each engaging one of the bearing flange 124A and the bearing flange 128A and the bearings 130A are ball bearings. However, other types of bearings, such as roller bearings, could be used and more than two ring gear carrier bearings 130A could be used or only one ring gear carrier bearing 130A could be used in the illustrated location.

Similarly, the aft carrier plate 94A includes an aft extending bearing flange 136A, the sun gear includes an aft bearing flange 137A, and a pair of sun gear carrier bearings 138A engaging both the bearing flanges 136A, 137A. Each of the sun gear carrier bearings 138A include an inner race 140A fixed to rotate with the sun gear 74A and an outer race 142A fixed relative to the bearing flange 136A. In the illustrated example, the sun gear carrier bearings 138A are ball bearings. However, other types of bearings, such as roller bearings, could be used and more than two sun gear carrier bearings 138A could be used or only one sun gear carrier bearing 138A could be used in the illustrated location.

One feature associated with utilizing at least one of the ring gear carrier bearings 130A and at least one of the sun gear carrier bearings 138A is the ability to maintain the sun gear 74A, the star gears 82A, and the ring gear 108A aligned and concentric. This reduces stress in the components that can result from misalignment. This arrangement further accomplishes the above feature by maintaining the sun gear 74A, the star gears 82A, and the ring gear 108A in a rigid arrangement through the use of the ring gear carrier bearings 130A and sun gear carrier bearings 138A. Because of the static nature of the sun gear 74A, the star gears 82A, and the ring gear 108A, the geared architecture 48 can be supported though the flexible carrier support 96A as opposed to a rigid support. One feature of this configuration is a reduction in flexibility needed in the flexible input shaft 70 and the flexible output shaft 120.

Figure 3:
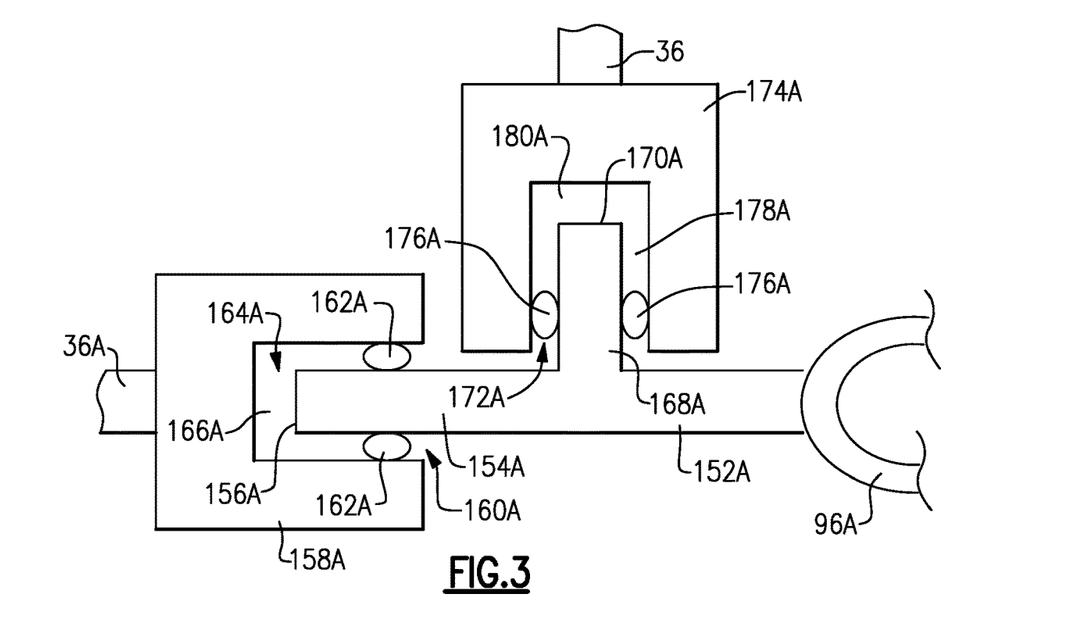
FIG. 3 illustrates is an enlarged view of an example support for the geared architecture of FIG. 2.

FIG. 3 is an enlarged view of a portion of the flexible carrier support 96A. In the illustrated example, a deflection limiter 150A is attached to the flexible carrier support 96A. The deflection limiter 150A includes a main branch 152A that extends from the flexible carrier support 96A. In the illustrated example, the main branch 152A extends in an axial direction, however, the main branch 152A could extend radially or the main branch 152A could extend in a direction with both a radial and axial component.

An axial branch 154A extends from the main branch 152A to a distal end 156A. A portion of the axial branch 154A adjacent the distal end 156A is located in a damper opening 160A in a radial damper housing 158A. The radial damper housing 158A is rigidly fixed relative to the engine static structure 36. The axial branch 154A includes a generally constant radial position relative to the engine axis A. In the illustrated example, radially inner and outer seals 162A form a fluid seal between the axial branch 154A and the damper opening 160A to define a damper cavity 164A filed with a damper fluid 166A, such as oil, to dampen vibrations in the flexible carrier support 96A. Additionally, the radial damper housing 158A includes radially inner and outer walls 165A, 167A, that limit radial movement of the axial branch 154A.

The deflection limiter 150A also includes a radial branch 168A that extends radially from the main branch 152A to a distal end 170A. The radial branch 168A includes a generally constant axial position relative to the engine axis A. A portion of the radial branch 168A adjacent the distal end 170A is located in a damper opening 172A in an axial damper housing 174A. The axial damper housing 174A is rigidly fixed relative to the engine static structure 36. In the illustrated example, axially forward and aft seals 176A form a fluid seal between the radial branch 168A and the damper opening 172A to define a damper cavity 178A filled with a damper fluid 180A, such as oil, to dampen vibrations in the flexible carrier support 96A. Additionally, the axial damper housing 174A includes axially forward and aft walls 182A, 184A, that limit axial movement of the radial branch 168A.

Figure 5:
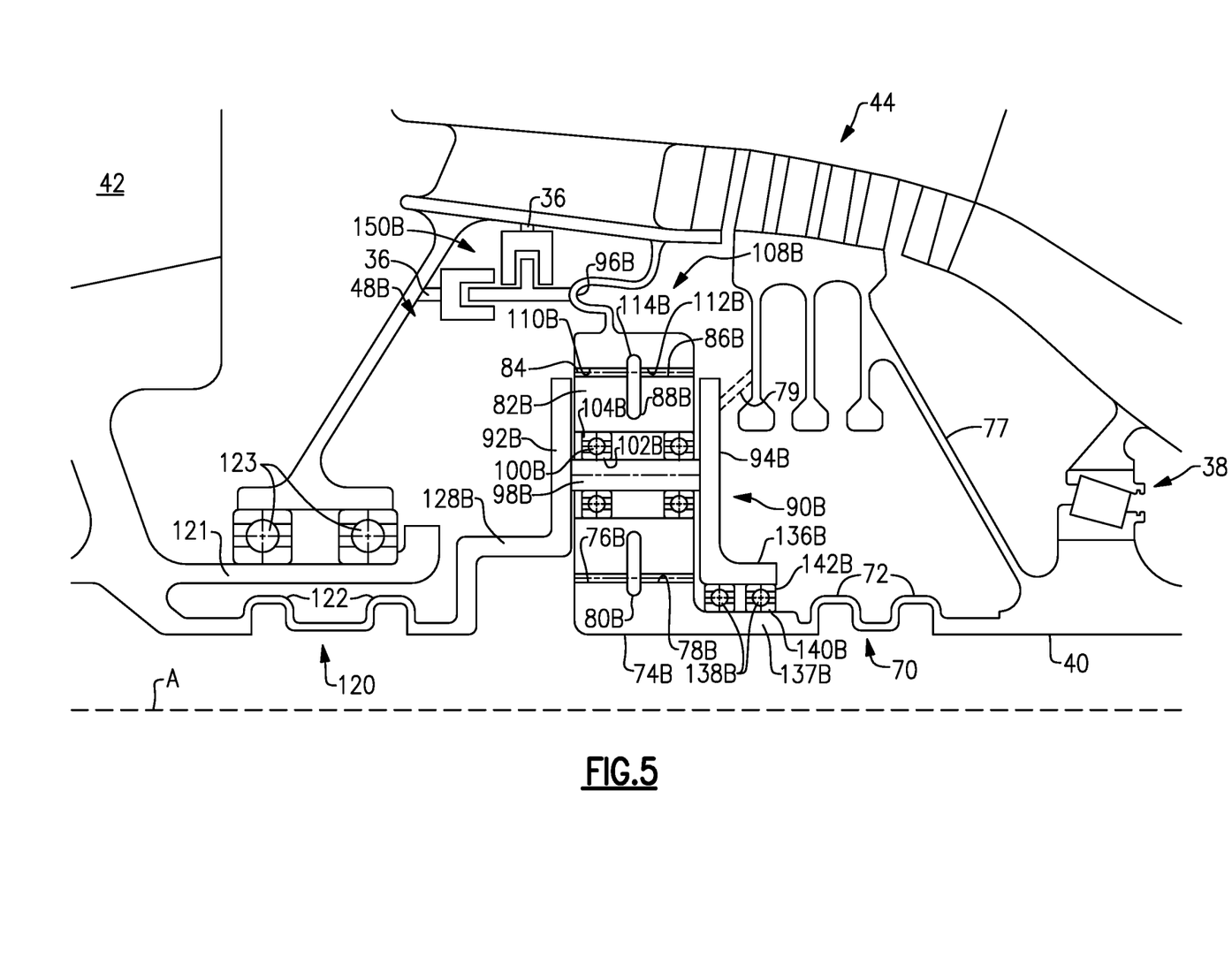
FIG. 5 illustrates a geared architecture according to another example.

FIG. 5 illustrates an enlarged view of a geared architecture 48B. The geared architecture 48B is similar to the geared architecture 48A except where described below or shown in the Figures.

Figure 7:
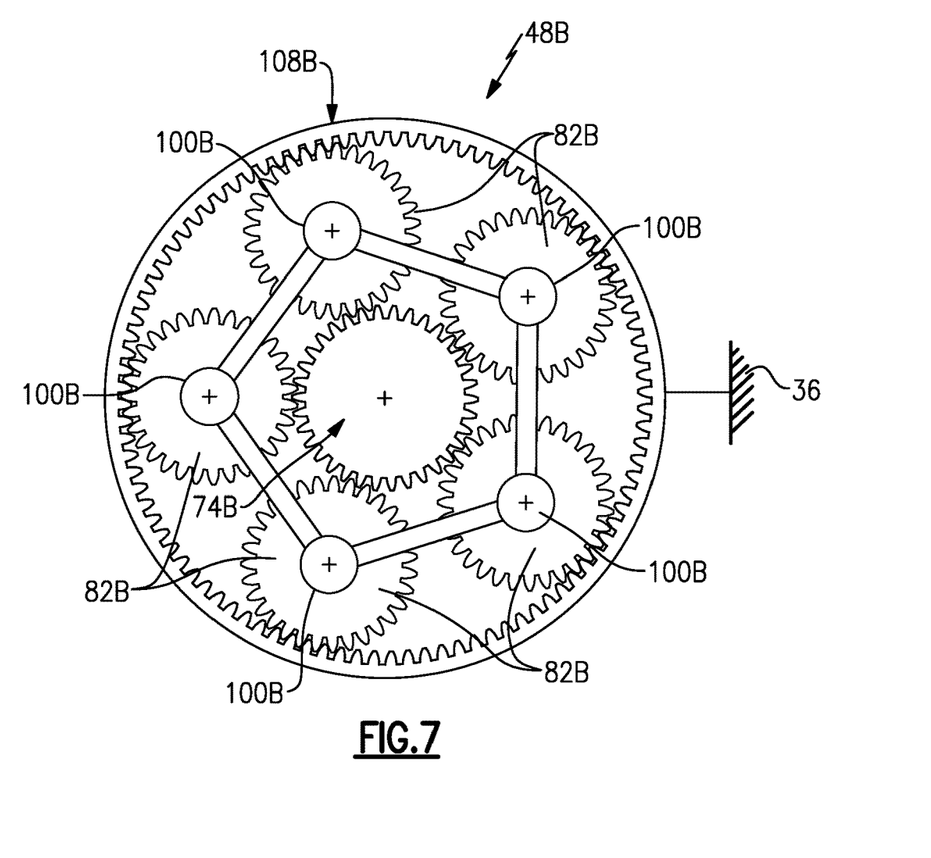
FIG. 7 is a cross-sectional view of the geared architecture of FIG. 3.

The geared architecture 48B can include a sun gear 74B, a carrier 90B supporting planet gears 82B, and a ring gear 108B. The sun gear 74B is driven by the flexible input shaft 70. In the illustrated example, the sun gear 74B includes a first set of sun gear teeth 76B located axially forward of a second set of sun gear teeth 78B that are separated from each other by a sun gear trough 80B. As shown in FIGS. 5 and 7, the planet gears 82B are circumferentially spaced around the sun gear 74B. The planet gears 82B also include a first set of planet gear teeth 84B located axially forward of a second set of planet gear teeth 86B that are separated from each other by a planet gear trough 88B. The first and second set of sun gear teeth 76B, 78B engage a corresponding one of the first and second set of planet gear teeth 84B, 86B, respectively.

The carrier 90B also includes a forward plate 92B fixed relative to an aft plate 94B for rotating about the engine axis A. In the illustrated example, the forward plate 92B is attached to a flexible output shaft 120 with a forward extending flange 128B. In the illustrated example, the forward extending flange 128B extends axially forward from a radially inner edge or portion of the forward plate 92B to the flexible output shaft 120.

In the illustrated example, the forward and aft plates 92B, 94B support planet gear shafts 98B that are fixed relative to the forward and aft plates 92B, 94B. Planet gear bearings 100B include an inner race 102B that is fixed relative to the planet gear shafts 98B and an outer race 104B that is fixed relative to the planet gears 82B and rotates with the planet gears 82B. Although the planet gear bearings 100B shown are ball bearings, other types of bearings such as roller bearings or journal bearings could be used to support the planet gears 82B.

A ring gear 108B is located radially outward from the planet gears 82B and includes a forward set of ring gear teeth 110B located axially forward of an aft set of ring gear teeth 112B and separated from each other by a ring gear trough 114B. The forward and aft sets of ring gear teeth 110B, 112B engage the forward and aft set of planet gear teeth 84B, 86B, respectively.

The aft plate 94B includes an aft extending bearing flange 136B, the sun gear includes an aft bearing flange 137B, and a pair of sun gear carrier bearings 138B engage both of the bearing flanges 136B, 137B. Each of the sun gear carrier bearings 138B include an inner race 140B fixed to rotate with the sun gear 74B and an outer race 142B fixed relative to the bearing flange 136B. In the illustrated example, the sun gear carrier bearings 138B are ball bearings. However, other types of bearings, such as roller bearings, could be used and more or less than two sun gear carrier bearings 138B could be used in the illustrated location.

Additionally, the aft plate 94B could be attached to the low pressure compressor 44 with a support 79 instead of a support 77 connected to the low spool 40 such that the fan 42 and the low pressure compressor 44 rotate at the same rotational speed.

One feature associated with utilizing the at least one of the sun gear carrier bearings 138B is the ability to maintain the sun gear 74B, the planet gears 82B, and the ring gear 108B aligned and concentric. This reduces stress in the components that can result from misalignment. This arrangement further accomplishes the above feature by maintaining the sun gear 74B, the planet gears 82B, and the ring gear 108B in a rigid arrangement through the sun gear carrier bearings 138B. Additionally, the static nature of the geared architecture 48 is further accomplished with the aft plate 94B attached to the engine static structure 36 though a flexible carrier support 96B. The flexible carrier support 96B allows for greater movement of the carrier 90B, while maintaining the sun gear 74B, the planet gears 82B, and the ring gear 108B to be aligned and concentric. Additionally, the flexible input shaft 70 and the flexible output shaft 120 allow forces from the fan 42 and inner shaft 40 to have little if any influence on alignment of the sun gear 74B, planet gears 82B, and ring gear 108B.

Because of the static nature of the sun gear 74B, the planet gears 82B, and the ring gear 108B, the geared architecture 48B can be supported though the flexible ring gear support 96B as opposed to a rigid support. One feature of this configuration is a reduction in flexibility needed in the flexible input shaft 70 and the flexible output shaft 120.

Figure 6:
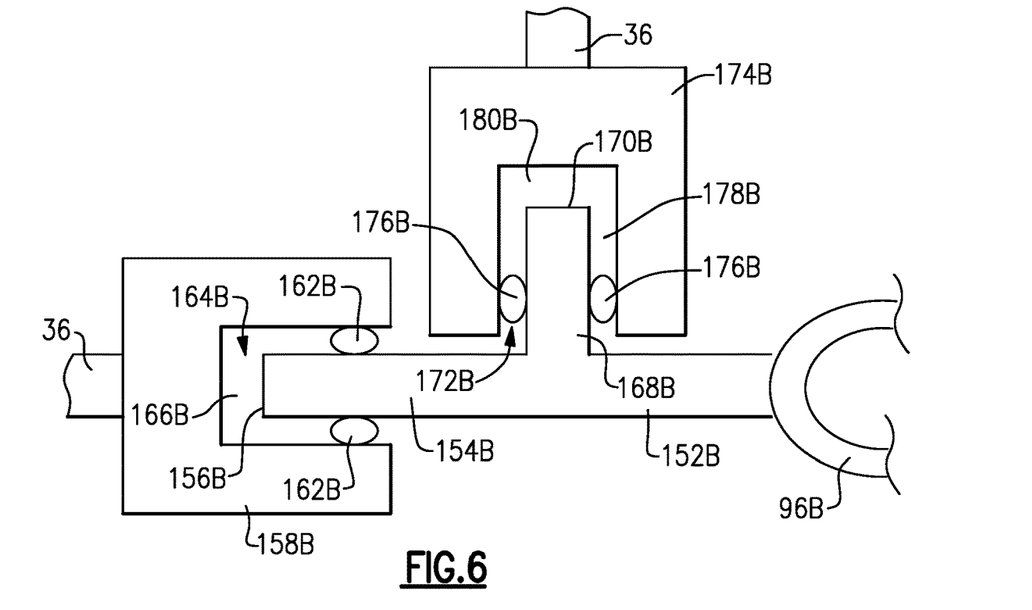
FIG. 6 illustrates is an enlarged view of an example support for the geared architecture of FIG. 2.

FIG. 6 is an enlarged view of a portion of the flexible carrier support 96B. In the illustrated example, a deflection limiter 150B is attached to the flexible ring gear support 96B. The deflection limiter 150B includes a main branch 152B that extends from the flexible ring gear support 96B. In the illustrated example, the main branch 152B extends in an axial direction, however, the main branch 152B could extend radially or the main branch 152B could extend in a direction with both a radial and axial component.

An axial branch 154B extends from the main branch 152B to a distal end 156B. A portion of the axial branch 154B adjacent the distal end 156B is located in a damper opening 160B in a radial damper housing 158B. The radial damper housing 158B is rigidly fixed relative to the engine static structure 36. The axial branch 154B includes a generally constant radial position relative to the engine axis A. In the illustrated example, radially inner and outer seals 162B form a fluid seal between the axial branch 154B and the damper opening 160B to define a damper cavity 164B filed with a damper fluid 166B, such as oil, to dampen vibrations in the flexible carrier support 96B. Additionally, the radial damper housing 158B includes radially inner and outer walls 165B, 167B, that limit radial movement of the axial branch 154B.

The deflection limiter 150B also includes a radial branch 168B that extends radially from the main branch 152B to a distal end 170B. The radial branch 168B includes a generally constant axial position relative to the engine axis A. A portion of the radial branch 168B adjacent the distal end 170B is located in a damper opening 172B in an axial damper housing 174B. The axial damper housing 174B is rigidly fixed relative to the engine static structure 36. In the illustrated example, axially forward and aft seals 176B form a fluid seal between the radial branch 168B and the damper opening 172B to define a damper cavity 178B filled with a damper fluid 180B, such as oil, to dampen vibrations in the flexible carrier support 96B. Additionally, the axial damper housing 174B includes axially forward and aft walls 182B, 184B, that limit axial movement of the radial branch 168B.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A turbofan engine comprising:
   a fan section;
   a turbine section in driving engagement with the fan section through a geared architecture, wherein the geared architecture includes:
      a plurality of intermediate gears surrounding a sun gear in driving engagement with a flexible input shaft and the sun gear includes an aft sun gear bearing flange;
      a carrier supporting the plurality of intermediate gears and includes a first carrier bearing flange extending axially aft from an aft plate of the carrier and at least one sun gear carrier bearing engages the first carrier bearing flange and the aft sun gear bearing flange; and
      a ring gear surrounding the plurality of intermediate gears;
   a flexible support supporting the geared architecture relative to an engine static structure;
   a deflection limiter including at least one of an axially extending branch or a radially extending branch; and
   a flexible output shaft in driving engagement with the fan section and driven by the geared architecture.

2. The turbofan engine of claim 1, wherein the deflection limiter includes the axially extending branch and a radial damper housing at least partially surrounds the axially extending branch.

3. The turbofan engine of claim 2, wherein at least one seal at least partially defines a fluid damper passage with the axially extending branch and the radial damper housing and a damper fluid is located in the fluid damper passage.

4. The turbofan engine of claim 1, wherein the deflection limiter includes the radially extending branch and an axial damper housing at least partially surrounds the radially extending branch.

5. The turbofan engine of claim 4, wherein at least one seal at least partially defines a fluid damper passage with the radially extending branch and the axial damper housing and a damper fluid is located in the fluid damper passage.

6. The turbofan engine of claim 1, wherein the ring gear includes a ring gear bearing flange and at least one ring gear carrier bearing engaging the first carrier bearing flange and the ring gear bearing flange.

7. The turbofan engine of claim 6, wherein the at least one ring gear carrier bearing includes at least one inner race that engages a radially outer side of the ring gear bearing flange and an outer race that engages a radially inner side of the first carrier bearing flange.

8. The turbofan engine of claim 7, wherein the ring gear includes an axially forward extending portion extending forward of a forward plate of the carrier and a radially inward extending portion having the ring gear bearing flange.

9. The turbofan engine of claim 8, wherein the ring gear bearing flange extends axially downstream from the radially inward extending portion of the ring gear.

10. A speed change mechanism for a gas turbine engine comprising:
    a geared architecture including:
       a plurality of intermediate gears surrounding a sun gear in driving engagement with a flexible input shaft;
       a carrier supporting the plurality of intermediate gears includes a first carrier bearing flange;
       a ring gear surrounding the plurality of intermediate gears and including a ring gear bearing flange; and
       at least one ring gear carrier bearing engaging the first carrier bearing flange and the ring gear bearing flange;
    a flexible support for supporting the geared architecture;
    a deflection limiter including at least one of an axially extending branch or a radially extending branch; and
    the geared architecture is in driving engagement with a flexible output shaft.

11. The speed change mechanism of claim 10, wherein the deflection limiter includes the axially extending branch and a radial damper housing at least partially surrounds the axially extending branch and the radially extending branch and an axial damper housing at least partially surrounds the radially extending branch.

12. The speed change mechanism of claim 11, wherein at least one seal at least partially defines a fluid damper passage with the axially extending branch and the radial damper housing and a damper fluid is located in the fluid damper passage.

13. The speed change mechanism of claim 11, wherein at least one seal at least partially defines a fluid damper passage with the radially extending branch and the axial damper housing and a damper fluid is located in the fluid damper passage.

14. The speed change mechanism of claim 10, wherein the at least one ring gear carrier bearing includes at least one inner race that engages a radially outer side of the ring gear bearing flange and an outer race that engages a radially inner side of the first carrier bearing flange.

15. The speed change mechanism of claim 14, wherein the ring gear includes an axially forward extending portion extending forward of a forward plate of the carrier and a radially inward extending portion having the ring gear bearing flange.

16. The speed change mechanism of claim 10, wherein the first carrier bearing flange extends axially aft from an aft plate of the carrier.

17. The speed change mechanism of claim 15, wherein sun gear includes an aft sun gear bearing flange and at least one sun gear carrier bearing engaging the first carrier bearing flange and the aft sun gear bearing flange.

* * * * *